United States Patent
Rahuel et al.

[11] Patent Number: 5,875,178
[45] Date of Patent: Feb. 23, 1999

[54] DIGITAL SIGNAL ORGANIZED IN SELF-CONTAINED DATA CONTAINERS, ESPECIALLY FOR DATA TRANSMISSION TO SELECTIVE CALL RECEIVERS

[75] Inventors: Jean-Claude Rahuel, Rennes; Alain Bache, Bruz; Edouard Guillouet, Rennes, all of France

[73] Assignees: France Telecom; Telediffusion de France, both of Paris, France

[21] Appl. No.: 737,124

[22] PCT Filed: Apr. 18, 1995

[86] PCT No.: PCT/FR95/00504

§ 371 Date: Feb. 3, 1997

§ 102(e) Date: Feb. 3, 1997

[87] PCT Pub. No.: WO95/28810

PCT Pub. Date: Oct. 26, 1995

[30] Foreign Application Priority Data

Apr. 19, 1994 [FR] France .................................. 94/04913

[51] Int. Cl.[6] .......................................................... H04J 3/16
[52] U.S. Cl. .......................... 370/313; 370/349; 370/392; 370/471
[58] Field of Search .................................... 370/313, 329, 370/341, 349, 389, 392, 395, 470, 471

[56] References Cited

U.S. PATENT DOCUMENTS

| | | | |
|---|---|---|---|
| 5,089,813 | 2/1992 | DeLuca et al. | 340/825.44 |
| 5,247,519 | 9/1993 | Snowden et al. | 370/313 |
| 5,379,290 | 1/1995 | Kleijne | 370/313 |
| 5,559,804 | 9/1996 | Amanda et al. | 370/349 |
| 5,600,633 | 2/1997 | Jaisingh et al. | 370/395 |
| 5,694,119 | 12/1997 | Ono | 370/313 |

FOREIGN PATENT DOCUMENTS

| | | | |
|---|---|---|---|
| 0 493 287 A1 | 1/1992 | European Pat. Off. | H04J 3/16 |
| 0 565 470 A1 | 10/1993 | European Pat. Off. | H04L 5/26 |
| WO 91/11866 | 8/1991 | WIPO . | |

OTHER PUBLICATIONS

Centre National d'Etudes des Télécommunications Ecole Nationale Supérieure des Télécommunications, *l'écho des Recherches*, No. 144 2$^{éme}$ trimestre 1991, spécial ATM_vol. I.

*Primary Examiner*—Chi H. Pham
*Assistant Examiner*—Ricky Q. Ngo
*Attorney, Agent, or Firm*—Kinney & Lange, P.A.

[57] ABSTRACT

A digital signal to be received by a plurality of receivers, particularly restricted-range receivers, and divided into signal frames of which at least some include both a main data channel consisting of sub-channels, and a data transport path including at least one data channel consisting of separate data blocks dedicated to a single service and known as containers. Each container includes a header (41) consisting of a selection sub-header (44) containing, inter alia, data (46) for identifying a group of at least one container destination receiver, and a service sub-header (45) containing, inter alia, dedicated service data; a separately convolutionally coded working data field (42) containing source data for a given service; and an error detection and/or correction data field 943). Said selection sub-headers (44) are disconnected from the respective containers and collected in at least one dedicated service container subjected to simplified channel coding to enable the receivers to detect the presence of a container dedicated thereto by low-cost decoding analysis of said dedicated service container, said selection sub-headers (44) further containing access data (410) for determining the position of the corresponding container in said data path. The above-system enables the digital audio broadcasting (DAB) standard to be used for broadcasting paging data.

10 Claims, 3 Drawing Sheets

DIGITAL SIGNAL ORGANIZED IN SELF-CONTAINED DATA CONTAINERS, ESPECIALLY FOR DATA TRANSMISSION TO SELECTIVE CALL RECEIVERS

BACKGROUND OF THE INVENTION

The field of the invention is that of the transmission of digital data by RF channels. More specifically, the invention relates to the transmission of information dedicated to a particular receiver, or to a group of identified receivers.

The invention can be applied especially to systems of digital transmission in which at least some of the receivers have an intermittent operation, i.e. they go into operation periodically, at predefined instants, so as to economize energy.

These may be, for example, receivers capable of receiving particular information (alarms, road information, time schedules for transportation means, magazines, medical services) or personal information (paging, faxes, calendaring information).

A particular field of application of the invention is that of one-way paging. Paging is understood to mean any system enabling the transmission of a message to a portable receiver that can advantageously be kept in a user's pocket. These systems can be used in particular to transmit a message to a person who is travelling when the sender of the message does not even know where his or her correspondent is.

Conventionally, such systems in the most simplest case enable the transmission of a sound and/or visual signal by a pocket receiver upon reception of a message. These systems are generally known as simple private call systems.

Other more elaborate receivers enable the reception and display of a short digital message such as for example a telephone number to be called or a coded piece of information.

Receivers of this kind are used especially in paging systems known as the "Operator" (registered mark) and "Alphapage" (registered mark) systems available in France.

These paging systems, as well as all other presently known paging systems, have many drawbacks.

First of all, they can be used at best to transmit only a short message. Consequently, in practice the subscriber receiving a message must always look for a telephone to find out the actual contents of the information intended for him or her.

Furthermore since, for obvious reasons of operating autonomy, portable receivers can be supplied only by batteries or cells, these receivers must have intermittent operation. More specifically, a paging receiver is most usually on standby (only a clock is powered) and goes into operation cyclically to detect a message, if any, that is intended for him or her.

This implies a particular management of the instant at which transmission is made so that each message is sent only when the destination receiver has left its standby state to go into operation.

By contrast, it is necessary that the receivers should have specific synchronization means so as to control the instants at which they go into operation. To do this, in known systems, temporal synchronization data elements are inserted among the paging data elements.

The corresponding synchronization operations hold the receiver in operation for a certain period of time leading to high energy consumption.

Furthermore, known broadcasting systems encounter difficulties in the reception of FM signals in many situations especially when they are mobile and/or they are used in urban environments (because of the Doppler effect, fading, multiple path echoes, scrambling, etc.). They therefore do not provide sufficient guarantee of reception.

In order to overcome some of these drawbacks, the patent application FR 9204479 entitled "Procédé de transmission de données numériques de radiomessagerie, et recepteur de radiomessagerie correspondent" (Method for the transmission of paging digital data elements and corresponding paging receiver) filed by the same Applicants as the present application, proposes a system of paging integrated into a more general system of digital broadcasting implementing time and frequency interlacing techniques such as the COFDM.

The use of this system can be used to provide for the transmission of data in an efficient way, even when the transmission channel is highly scrambled. Furthermore, no new infrastructure is required since the same medium is used as for broadcasting (DAB standard).

In this known system, there is provided a fast information channel (FIC) including flags to indicate the presence of information corresponding to the services given. To limit the energy consumption, this FIC channel is not frequency-interlaced. The paging data elements may be inserted into this FIC channel if they are small in number. Otherwise, they are placed in a main service channel (MSC). In this case, they undergo temporal and frequency interlacing.

In practice, it is noted that the place available in the FIC channel is insufficient to enable quality services, especially the supply of information of great length.

This is especially the case for the new applications of broadcasting data to portable terminals (known as PDAs or personal data agents) used for example for services for the transmission of files, road information, general information, stock exchange information, fleet management information, etc.

It is therefore necessary to place at least a part of the paging data elements (and more generally of identified data elements, namely data elements that can be identified by one or more destination receivers) in the MSC. This raises a major drawback, namely the storage of several frames (16 in the case of the present DAB standard) to carry out the de-interlacing and therefore to reconstruct the messages.

Furthermore, the decoding of a useful data element requires the taking into account of a large number of unnecessary data elements (especially all the data elements contained in the FIC and in the channel in which the useful information is contained).

This technique is therefore clearly incompatible with an optimization of reception in receivers with limited autonomy which must have an operation that is intermittent and limited to the maximum extent in time.

SUMMARY OF THE INVENTION

The invention is aimed in particular at overcoming these prior art drawbacks.

More specifically, an aim of the invention is to provide a digital signal structure carrying dedicated data elements to identified receivers and enabling the maximum reduction of the electrical consumption of the receivers so as to provide for the greater possible autonomy for these receivers.

This aim is expressed especially by the following two sub-goals:

reducing the operating time of each receiver and more specifically increasing the ratio between the standby time during which the electrical consumption is greatly reduced and the operating time;

limiting the processing operations (analog and digital operations) performed during this operating time.

It is another aim of the invention to provide a signal of this kind providing total compatibility with the signal structure standardized for digital audio broadcasting (DAB) so as to make profitable use firstly of the broadcasting network and secondly of the encoding efficiency associated with this broadcasting system.

The invention is also aimed at providing a signal of this kind that enables the conveyance of any type of data, especially data having a predefined format such as for example cells according to the ATM (asynchronous transfer mode).

Yet anther aim of the invention is to provide a signal of this kind wherein the power of the encoding can be adapted to the size of the information elements transmitted.

Yet another aim of the invention is to provide a signal of this kind enabling the transmission of dedicated data elements towards several types of receiver. Thus the data elements may for example be standard paging data elements but also large-sized data files designed for example for autonomous microcomputers or again generic data designed for a group of receivers (whether this is information in real time such as road information, warnings etc. or, more generally, cyclical information or radio-television programs).

These aims as well as others that shall appear hereinafter are achieved according to the invention by a digital signal designed to be received by a plurality of receivers and especially receivers with limited (energy) autonomy, this signal being of the type organized in signal frames, each signal comprising a main service channel (MSC) organized into sub-channels (according to the terminology conventionally used in DAB) and possibly subjected to temporal and/or frequency interlacing, at least certain of said frames furthermore comprising a data transport path comprising at least one data channel organized into blocks of independent data elements dedicated to a single service, called containers, each container comprising:
  a header constituted by a selection sub-header containing inter alia data elements for identifying a group of at least one container destination receiver (or for the identification of a given service) and a service sub-header containing inter alia data dedicated to the service;
  a useful data field containing source data elements corresponding to a given service; and
  an error detection and/or correction data field, said selection sub-headers being disconnected from their containers and assembled in at least one specialized service container subjected to a simplified channel encoding so that said receivers can detect the presence of a container that is dedicated to it by the low-cost analysis of the decoding of said specialized service container, said selection sub-headers further containing access data elements enabling the position of the corresponding container in said data path to be determined, each container independently undergoing a specific convolutional encoding.

Thus, the invention proposes a novel structure for the transmission of data in a so-called container organization. These containers are blocks of data elements that have several novel and inventive aspects as compared with the prior art:

they are small-sized and dedicated to a specific service. The system therefore provides great flexibility of use;

they undergo independent source encoding. Consequently, they may be decoded independently thus enabling the processing operations to be limited to the maximum extent;

the headers of each container are subdivided according to a technique that is quite novel (in the known techniques, the headers are linked to the data fields) and a part of each header is assembled in a predefined location in a special selection container. Once again, this enables a reduction of the standby time for each receiver, by reading only the selection container, directly knows whether a container liable to be sent to it (the selection header may designate, in particular, a service, a group of receivers or a single receiver) is present or the location of this container.

These characteristics make it possible to guarantee maximum autonomy for the autonomous receivers.

According to an advantageous embodiment, said data path is subdivided into at least two channels, each of said channels undergoing a distinct channel encoding. In particular, at least one first channel can undergo a temporal interlacing whereas at least one second channel does not undergo any temporal interlacing.

This makes it possible in particular to encode the data elements differently as a function of their size, category or type of receiver. It is desirable especially that the data elements intended for "small" paging receivers should not to be interlaced. Similarly, the selection data elements will not obligatorily be temporally interlaced so as to reduce the obligatory processing operations at each frame. The file type data elements intended for example for portable microcomputers may on the contrary be interlaced.

Preferably, and in order to maintain maximum compatibility with equipment according to the DAB standard, each container consists of a whole number of capacity units. A capacity unit of this type corresponds in a known way to the smallest structure or to the smallest data block, addressable after convolution, in the DAB signal, namely 64 bits. Thus conventionally, the size of a DAB sub-channel is defined in numbers of "capacity units" constituting it. According to the invention, each container could, for example, comprise six capacity units, namely 384 bits.

According to an advantageous embodiment of the invention, at least certain of said containers each carry a data cell in the ATM (asynchronous transfer mode) format.

The invention also provides a bridge between the world of ATM asynchronous radiocommunications and that of broadcast paging.

Preferably, at least certain of said selection sub-headers are transmitted by anticipation in at least one frame preceding the frame that contains the corresponding container.

This makes it possible to give the receiver a lengthy reaction time and hence to spread the processing operations. Furthermore, this technique proves to be necessary once a temporal interlacing is implemented. In this case, the header must be transmitted sufficiently early to take account of the depth of the interlacing (i.e. for example at least 16 frames in advance in the case of a signal according to the DAB standard).

Advantageously, at least certain of said containers comprise confirmation data elements that are placed at the beginning of the container and make it possible to specify and/or validate the identification of a destination receiver of the following data elements in said container.

In this case, the receiver may ascertain that there is truly a container corresponding to the group (a set that may possibly contain only one element then corresponding directly to the receiver) or to the service with which the receiver is associated before carrying out the complete decoding thereof. Once again, this enables a saving of energy.

Preferably, said data path is placed at the end of each frame. This enables the receiver to identify this data path easily and directly.

The invention also relates to a method for the broadcasting of a digital signal comprising the following steps:

the providing of at least one identified source signal element designed to be received by at least one specific receiver;

the construction of at least one data container corresponding to said identified source signal element, comprising the steps of:

the subdividing of said signal source element into at least one data block of a predetermined size;

the specific convolutional encoding of said data block;

the association, with said data block, of a selection sub-header containing especially data elements for the identification of at least one container destination receiver and a service sub-header containing in particular data elements dedicated to the service;

the construction of a data path containing a plurality of containers and assembling, at a specified location, all of said selection sub-headers;

the construction of a signal frame comprising in particular said data path;

the transmission of said frame.

Furthermore, the invention also relates to a method for the reception of an identified digital signal element integrated into a signal frame in the form of data containers, in a receiver that is the addressee of said signal element and has sporadic operation, comprising the following steps:

the putting of the device out of standby mode, this putting out of standby mode being activated at regular time intervals, corresponding substantially to the duration of at least one of said frames, by means of an internal clock;

the search for the synchronization of the frame that is being transmitted and the resetting of said internal clock;

the reading, at a predetermined location in said frame, of a set of selection sub-headers corresponding to the containers contained in said frame and the search for a selection sub-header designating a container intended for said receiver;

the analysis of said selection sub-header designating a container intended for said receiver so as to determine the position in said frame of said container;

the direct reading of said container and the convolutional decoding of said container independently of the other containers.

BRIEF DESCRIPTION OF THE DRAWING

Other features and advantages of the invention shall appear from the following description of a preferred embodiment of the invention given by way of a non-restrictive illustration and from the appended drawings in which.

DETAILED DESCRIPTION

Figure 1:
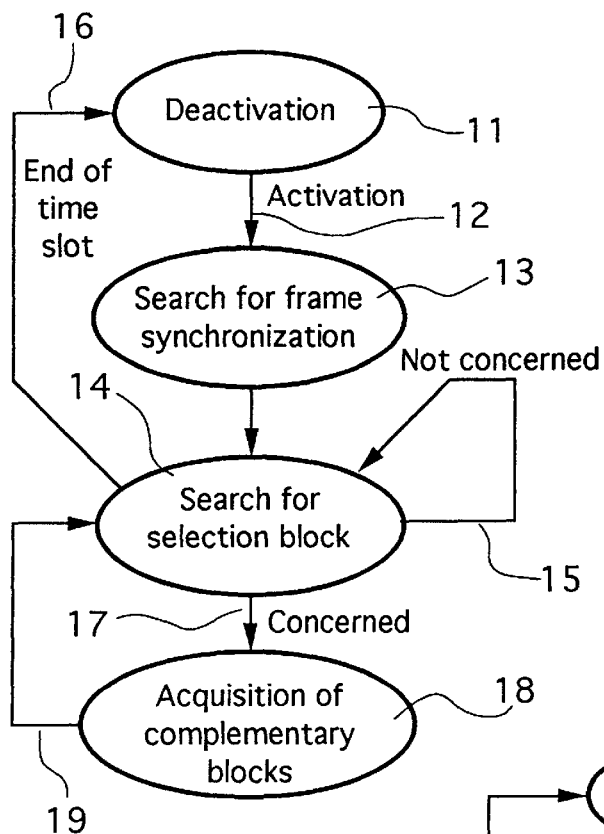
FIG. 1 is a state diagram illustrating a first mode of operation of an intermittent receiver according to the invention.

The invention therefore relates to a broadcasting signal adapted to the broadcasting of data elements intended for independent receivers with intermittent operation and especially for so-called PDA receivers.

In the example described hereinafter, this signal is based on the signal used by the DAB (digital audio broadcasting) transmission system. In particular, it is aimed at enabling the broadcasting of data to equipment with low energy resources without destabilizing the process of proposing standards that is now under way or delaying the implementation of the basic DAB.

The COFDM and multiplexing techniques proposed by the DAB standard are highly efficient for the transmission of high quality sound signals for they are very well adapted to the processing of one-way continuous information elements. These techniques are described for example in the French patent application No. FR-9204479.

The present specifications of this DAB standard enable the envisaging of data broadcasting services that would use demodulators permanently monitoring the DAB signal and therefore working in real time on the entire signal useful for the processing of the service.

These specifications also enable the definition of the cyclical broadcasting services for which the deactivation period is great. Once activated, the receiver would demodulate the DAB signal as earlier. The duration of the working window would be relatively lengthy but compensated for by a deactivation period that is itself lengthy.

By contrast, these specifications are ill-suited to data services based on small-duration broadcasting cycles. To enable the application of these specifications, it is necessary to introduce major constraints on the generation of the multiplex and synchronize the source with the multiplexing equipment. The concerned services typically have a one-minute cycle and they use short messages transmitted sporadically to a mobile subscriber (or group of subscribers) having low energy resources.

The services conveyed by such a system may belong to two categories:

The first is characterized by a processing of the information in real time for restitution and for use that are, in principle, immediate. The transmission of sound programs or programs consisting of moving images (television, visiophone, visioconference images) corresponds to this category. In this transmission, certain information elements are considered to be highly important while others are less so. Similarly, the loss of a part of the data elements temporarily causes deterioration in the service but does not make it impossible if it happens infrequently.

The second category corresponds to the transmission of information blocks of variable size where all the data elements have the same importance and must be received for the operation of the service that uses them. This category includes the broadcasting of files for example. There is a storage and a frequent use of the data elements received.

The second category especially comprises services organized in broadcasting cycles, wherein the time of access to the service is directly linked to the duration of the broadcasting cycle. It is possible to distinguish three types of cyclical information elements:

real-time information (warnings, road information of the type pertaining to events or states, time schedules for transportation means, emergency medical services, etc.), personal information (paging information for one or more designated subscribers, remote control of instruments), the other information elements (magazines, radio-television programs, stock exchange information, racing results, non-emergency medical services, road information relating to trends, forecasts and planning, etc.).

These real-time services are urgent and imperative. The real-time information must be based on short cycles (between 1 minute and 10 minutes typically) with priority being given to urgent information. These messages transmitted are small-sized (between 4 and 12 bytes).

The pure paging services are based on very short cycles (less than 2 minutes), small-sized messages (between 4 and 80 bytes) and the fact that the messages sent to a specific subscriber are infrequent.

The more elaborate paging messages use messages of greater volume and may therefore be considered to be services for the broadcasting of data elements with an addressing of the subscriber.

This addressing can be profitably used, according to the invention, to separate the messages into two parts: a first part for the selection of the subscriber with a pointer (time and position) to the rest of the message and a second part containing the message itself. The message consists of a small-sized part (8 to 12 bytes) and of the rest of the message (80 bytes to XX Kbytes). In this case, the basic mechanisms of the paging system may be applied to stages for the monitoring and selection of the subscriber. This technique which is known per se is described in the already-mentioned patent application FR 9204479.

The other services are less critical from the temporal viewpoint and may be based on cycles of 10 minutes and more. The access to the services is done by the continuous monitoring of the COFDM flux or upon activation as defined in a calendar known beforehand, remote loaded by the network itself or else with the same technique as above.

The most important characteristic for these services is determined by the use of an RF broadcasting network. The link is in principle a one-way link (or a highly dissymmetrical link should a return path be planned).

Two main classes of services may be distinguished. The first one is blind broadcasting towards the users. The second class enables the application to know:

whether the user is present, whether the information has been properly transmitted, the nature of the information to be transmitted (dialogue).

The services that use one-way broadcasting entail the greatest constraints when they pertain to receivers having little available energy. For there must obligatorily be synchronization between the transmission of data elements and their reception. The securing of the transmission can be obtained only by a very powerful device for protection against transmission errors and/or by a rebroadcasting of the information.

The fact that the services intended for PDAs are obliged to consume as little current as possible makes it necessary for receivers to work in standby mode and to get synchronized with precision as swiftly as possible when they are activated. At a first stage, the receiver must get synchronized with the DAB signal.

This synchronization is provided by two symbols defined by the standard:

the NUL symbol, the TFPC symbol.

The former symbol provides, in a known way, for a rough synchronization while the latter provides for a fine synchronization in time and in frequency.

Then, the receiver must get synchronized with the service to be processed.

Substantial energy savings can be achieved according to the invention if the period of activity of the terminals is as small as possible in relation to the services processed. This is obtained by the placing of the receiver in a state of standby. It is desirable also to limit the power needed for the decoding of the data elements.

This saving of power is obtained by:

separating the acquisition (with storage), done obligatorily in real time, of the decoding of the signal which may be done in variably deferred time, and/or limiting the size of the signal to be decoded to what is strictly necessary.

The general principle is to provide for the activation of the terminals on specific time slots which will be as spaced out as the constraints of the service allow it. This activation may be programmed by an internal clock for example.

According to the invention, the information to be broadcast may be split up into elementary sections to achieve processing economies. Each section or short message is separated into two parts:

a selection block (which is as short as possible), one or more complementary blocks.

The selection blocks are combined in a selection channel on which the decoding processing operation is minimized.

The complementary blocks are placed in a separate channel whose processing may be more complex for it will not be decoded (partially) unless the receiver is concerned (indication obtained in the selection block).

The working of a terminal may be represented by the state diagram of FIG. 1, in the particular case of a service addressed specifically to a person. It will be noted that, for other services and especially for real-time services such as sound program broadcasting services, permanent monitoring (namely without passage into a standby mode) must be implemented.

The receiver is in a deactivated state at 11. At a predetermined instant, an internal clock orders its activation at 12. It then makes a search (13) for the synchronization on the frame (symbols NUL and TFPC). Then, it consults (14) the selection block to find out if it is concerned by a message. There are three possible situations:

the receiver is not concerned by the selection data elements in progress and the operation is still in the slot in which the selection data elements for this receiver may be found (15). It remains in a state of searching 14 for selection blocks;

the receiver is not concerned by the selection data elements in progress and the slot in which the selection data elements for this receiver may be found is terminated (16). It returns to a state of deactivation at 11;

the receiver is concerned by the selection data elements (17). It then goes into a state of acquisition of complementary data elements at 18.

After the acquisition 18 of the complementary data elements, the system (19) returns to a search for selection data elements at 14.

To carry out the acquisition of a block as economically as possible, this block should ascertain at least some of the following criteria:

a block placed in a temporarily non-interlaced channel (or weakly interlaced channel), a channel whose position in the multiplex is invariable and known to the terminal without the decoding of the FIC, a block placed in a frame with a known number (possibly specific to a service or a group of terminals).

According to an essential characteristic of the invention, each signal frame comprises (at least) one selection block consisting of a selection criterion and one pointer for access to complementary data elements. The information needed to make an unfailing selection depends on the parameters of the service. These are for example:

the identity of the service, the identity of the addressee or addressees if the service is customized, the identity of the message if it is identified, the identity of the section of the message if this message has been sectioned or repeated.

Two strategies may be envisaged:

the selection criterion is sufficiently precise for the decoding of the complementary block to take place without error (principle illustrated in FIG. 1), the criterion enables a pre-selection that will be confirmed or invalidated by an additional criterion which may be placed in the complementary data block or in another intermediate block known as the confirmation block.

Since it is advantageous to have fixed length selection blocks whose fields are as short as possible for the services that do not use them, it is preferable to distribute the information over several blocks.

For example:

a pre-selection block comprising at least the identity of the service, a confirmation block comprising the reference of the message and that of the section.

The identity of the addressee or addressees is defined in the messages connecting a user to a service, a message, etc. This association may be achieved by a very precise pointing device. It is also possible for example to define a system of addressing with three levels:

pre-selection: the presence of a container belonging to the service associated with the receiver;

confirmation: the presence of a container of this service corresponding to the group of receivers to which the receiver belongs;

connection (pointing): access to the container or containers intended for the receiver with also a stringing of containers by appropriate pointing.

The confirmation block is placed at the beginning of the complementary data elements. For it is far too small to be isolated (some bytes).

The pre-selection field contains all or a part of the following information (pertaining to the complementary block):

position, length, protection (efficiency of the convolutional encoding).

The position may be given in the following way (this has to be fixed when the system is set up):

absolute in the DAB flux, or relative, internal to the data channel.

Figure 2:
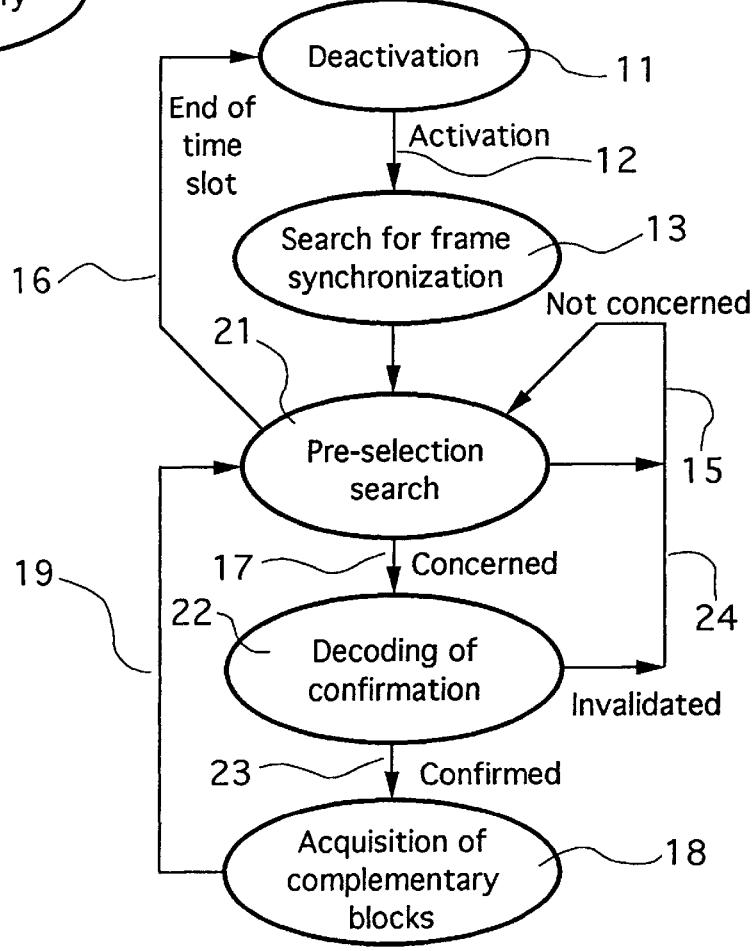
FIG. 2 shows another state diagram illustrating a second mode of operation of a receiver according to the invention implementing a strategy of pre-selection and then of confirmation.

The diagram of FIG. 2 shows the value of the addition of the confirmation field.

In this FIG. 2, the phases of deactivation 11, searching for the synchronization 13 and acquiring complementary data elements 18 are identical to the phases bearing the same numbers described in FIG. 1. The search for selection data elements 14 is replaced by a search 21 for pre-selection data elements working on the same principle.

In the event of the detection of data elements pertaining to the receiver, the receiver goes into a mode 22 of decoding the confirmation data elements placed at the beginning of the complementary data elements designated by the pre-selection data elements. If the selection is confirmed (23), the receiver goes into the mode of acquisition and decoding of the following complementary data elements. If not, it returns (24) to the pre-selection search 21.

The data paths have several parts, and especially at least one data channel of temporally non-interlaced elements (fast channel) enabling fast access to the information elements conveyed. The absence of interlacing on 16 frames is compensated for by a repetition of the messages for the services requiring it.

Figure 3:
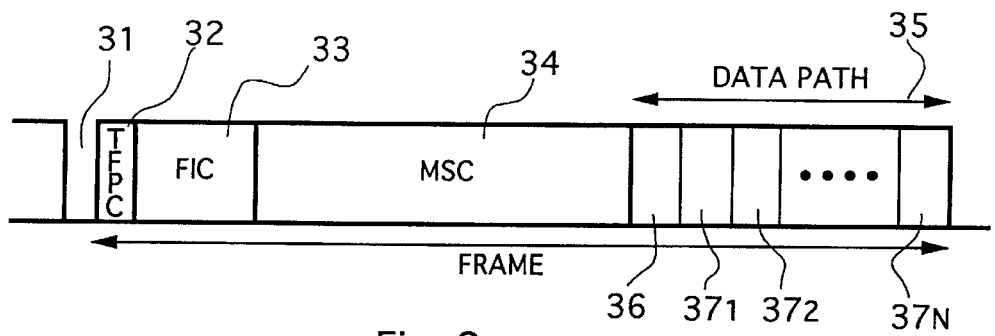
FIG. 3 illustrates the structure of a frame signal according to the invention.

FIG. 3 exemplifies a signal frame according to the invention.

This frame comprises first of all the following standard elements:

first synchronization symbol NUL 31;

second synchronization and automatic frequency control symbol TFPC 32;

fast information channel FIC 33;

main service channel MSC 34.

According to the invention, the frame furthermore comprises a path 35 dedicated to the data elements organized into channels themselves containing containers. This path 35 in particular has a signalling channel 36.

The messages for the organization of the data path, access control messages, selection of subscribers and/or of services and alarm messages that have to be restored in real time could, as the case may be, go through the channel 36 which is dedicated as a priority to the signalling.

It is preferably positioned at the end of a frame, which is the only position that can be easily identified in the frame. If this is impossible to achieve (for example for reasons of standardization), the information on position and size is preferably found in the FIC channel.

The other parts $37_1$ to $37_N$, called data channels, may be selectively interlaced or not. This distribution into channels may be modified in time as a function of the indications given in general signalling channels.

According to an essential characteristic of the invention, the data path is formed by containers aligned on a multiple of capacity units. A container of this kind is shown schematically in FIG. 4.

Each container is assigned to a single service. It contains a header 41, then the data elements pertaining to the service (payload) 42 and finally a suffix 43. The convolutional encoding is applied independently to each container and more specifically to the remaining part (elements 45, 42 and 43) after separation of the selection header 44 according to the principle explained here below. The closing bits are introduced by the puncturing of the code.

A simple operation of error detection/correction on the entire container is sufficient for, in COFDM mode, the transition between operation and non-operation is very sharp. It will therefore be sought chiefly to detect the incorrigible errors with a view to eliminating the erroneous containers and the upper level mechanisms must be oriented towards message recomposition techniques based on the reception with holes in the information.

The suffix 43 contains a CRC. The position of the suffix 43 may have to change, for it is located in the puncturing zone of the convolutional encoding for the insertion of the closing bits. If not, new puncturing rules will be chosen. The CRC must enable the efficient detection and correction of errors.

The organization into containers allocated to a single service according to the present invention makes it possible:

to disturb only one service at a time when there are problems of reception, to simply designate the containers of one service among the others.

Figure 4:
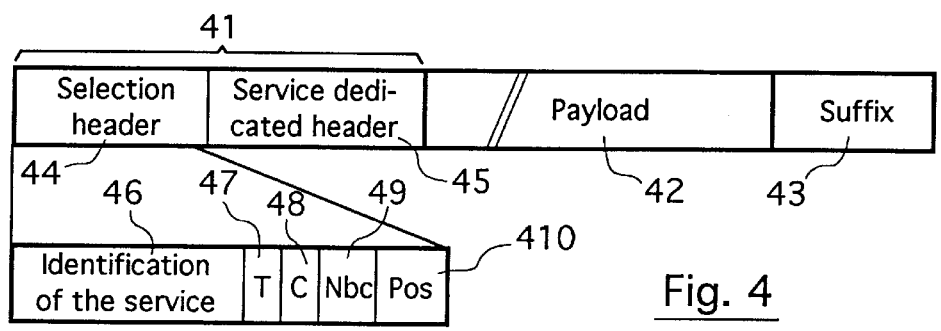
FIG. 4 shows a data container according to the invention as conveyed by the data path of the frame of FIG. 3.

For reasons of energy savings, the header of a container is split up (physically) into two parts as shown in FIG. 4:

the selection header 44 of one out of N services, the header useful for the conveyance of service data elements 45.

The selection header 44 is an essential characteristic of the invention. It may for example have a fixed size (28 or 32 bits) and comprise the following fields:

the identification of the service 46 (14 or 16 bits);

size of the container T 47 (2 bits);

type of convolution C 48 (2 bits);

number of consecutive containers Nbc 49 (2 or 4 bits);

position of the container Pos 410 (8 bits).

It is possible for the fields Nbc and Pos not to exist. In this case, it is necessary to have as many header fields as there are containers. The choice between these two approaches is made as a function of the most appropriate modes of transportation. If the field Pos does not exist, there is a greater sensitivity to errors, for an error on the values Nbc or T leads to a loss of all the information of the channel. The addition of an absolute positioning field enables the elimination of this defect.

The distribution of the information between the selection header 44 and the header dedicated to the services 45 is adjusted, depending on the embodiment. It may prove to be necessary to integrate additional fields into the selection header 44. The above proposition gives the minimum information to be integrated.

The size of the containers after convolution is advantageously a whole-number multiple of 384 bits. Their sizes before convolution may therefore be:

|  | Size = 384 | Size = 768 | Size = 1152 | Size = 1536 |
|---|---|---|---|---|
| efficiency ¼ | 12 bytes | 24 bytes | 36 bytes | 48 bytes |
| efficiency ⅓ | 16 bytes | 32 bytes | 48 bytes | 64 bytes |
| efficiency ⅜ | 18 bytes | 36 bytes | 54 bytes | 72 bytes |
| efficiency ½ | 24 bytes | 48 bytes | 72 bytes | 96 bytes |

It is possible that the size of the containers may not vary during possible repetitions to enable a reconstruction by the discontinuous reception of information.

The table here above shows that the 54-byte size is particularly well suited to he conveyance of ATM cells. Indeed, it can be used to provide a transparent mode for the 53 unprocessed bytes or an improved transportation mode for the 48 payload bytes (cf. types of containers described here below).

These various sizes make it possible to easily adapt to the types of data elements to be conveyed. Indeed, the small sizes will be rather used for very short messages (example: digital paging, signalling path message systems, etc.) or pointers to bulkier information. Conversely, the containers of the last column will be used preferably to convey bulky data files or messages of the order of 80 bytes.

The efficiency of the convolutional encoding on the selection header must be equal to that of the most protected service to avoid "gains" of containers in the channel considered.

The structure of the signal of the invention has several advantages.

In particular, it is possible to mix containers having different types of protection against errors (efficiency of the different convolutional encoding) for the size and the type of convolutional encoding are known before the so-called Viterbi decoding is begun.

In fact, according to an essential characteristic of the invention, to avoid the processing of the 80 truncation bits at each container, all the selection headers are grouped together at the beginning of the data channels.

The receivers then only have to analyze this part to identify the containers intended for them (step 14, FIG. 1 and step 21, FIG. 2). All these selection headers are grouped together in service containers at the beginning of each data channel.

Figure 5:
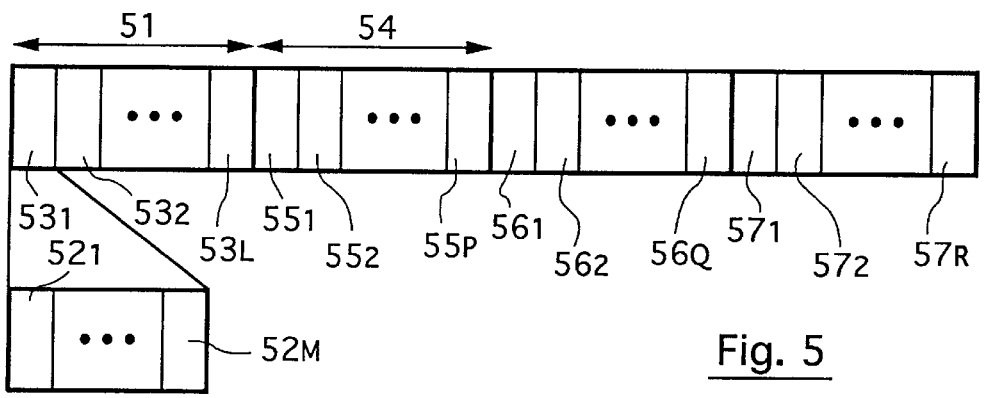
FIG. 5 shows the structure of a data channel of the data path of FIG. 3.

FIG. 5 illustrates a data channel of this kind. It contains a service path 51 containing all the selection headers $52_1$ to $52_M$ of containers. These service paths undergo a convolutional encoding whose efficiency is at least equal to the efficiency of the most protected containers of the channel concerned. For the channel containing the main signalling path, this efficiency will be known beforehand (efficiency=¼, ⅓ or ⅜ to be defined).

Figure 6:
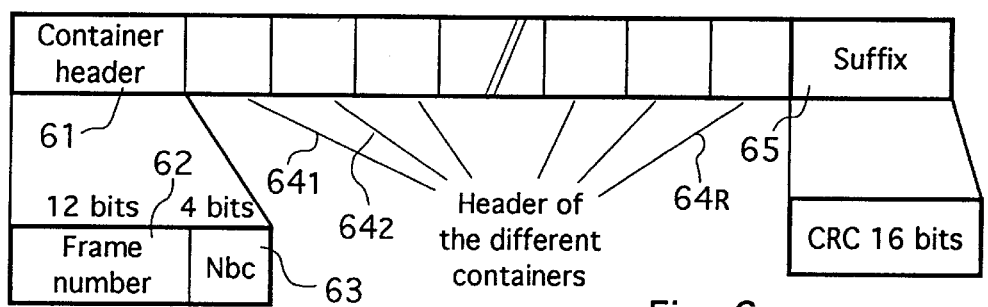
FIG. 6 illustrates the particular case of a container for the transportation of selection sub-headers.

The selection headers are grouped together in service containers $53_1$ to $53_L$ whose structuring is illustrated in FIG. 6 and shown more precisely here below.

Each channel then has a main signalling path 54 consisting of containers $55_1$ to $55_P$ belonging to the first non-interlaced data channel whose position is fixed and known.

The signalling path 54 conveys the information elements (or pointers towards these information elements) for:

the organization of the data channel (positioning of the selection headers of the different data channels, characteristics of these data channels, etc.);

the routing of services (for example, alternative frequency dedicated to the tracking of a network);

access to services (for example, access control, etc.);

etc.

The information elements pertaining to a particular service are conveyed by the control containers $56_1$ to $56_Q$ of this service. These are in particular information elements pertaining to:

the routing of the services (for example, the alternative frequencies dedicated to a service or to a group of services, etc.);

a schedule of services;

the addressing and/or connection of users to services;

the dynamic definition of groups of subscribers;

etc.

Finally, the channel comprises a series of containers $57_1$ to $57_R$ of useful data elements.

A channel of this kind may be interlaced or not interlaced as a function of the needs and/or type of receiver.

A description is now given, by way of an example, of different possible structures of containers as a function of the applications.

In general, the type of data element conveyed determines a particular mode of conveying data elements. The length of the fields are given only by way of indication. Other fields and other types of containers may be defined as a function of need.

1. Service channel container (FIG. 6)

The service header 61 of the container has a frame No. 62, encoded on 12 bits, and the number of containers remaining in the service path Nbc 63 on 4 bits. In another embodiment, Nbc may be replaced by a bit P/D equal to 1 for the last container. The three remaining binary elements are reserved for future use.

The container then has a series of headers $64_1$ to $64_S$ of the containers of the channel, then a suffix 65 which is a CRC on 16 bits.

2. Container for services with sporadic access and high temporal constraints

The selection header (positioned in the service path) contains the service identifier or the logic path identifier enabling the temporary association of the containers with a given service. Message and service or logic path identifiers enable the association of one (or more) users with a message. A technique that uses pointing may also be implemented.

The service header notably comprises a message identifier, incremented by 1 whenever a new message is transmitted (modulo 1024 for example).

The rest of the header provides for the reconstruction of a given message. The first container of a message indicates the total number of containers of the message. The intermediate containers convey the indication of the number of containers remaining to be transmitted. This permits a discontinuous reception of the message. The last container indicates the useful length of the data elements conveyed in this container.

Complementary information such as the type of information (data or commands or scrambling) may be added.

3. Containers for file-transportation services

All the data elements that belong to these services are conveyed in containers assigned to one or more users by means of the associated signalling path. This designation may also be done by a pointing device as described here above. A pointer associates one (or more) subscriber numbers to a logic path and consequently to a file. It may designate the position of this logic path in the data path and given the information necessary for tracking the containers concerned.

If the access information is too bulky, the pointer may designate a signalling container in the concerned data path.

This container then indicates the place in which the useful data elements of the service are located.

The logic path is open for the transmission of the entire file (one session). The file is split up into groups of data elements and then into containers of identical size (the last container contains the rest of the data). A group of data elements may be formed by 256 containers.

A logic path identifier contained in the selection header enables the temporary association of the containers with a given service (session). A data group identifier enables the association of one (or more) users with the data groups.

The rest of the header provides for the reconstruction of a data group. The first container of a data group indicates the total number of containers of the group. The intermediate containers convey the indication of the number of containers remaining to be transmitted. The last container indicates the useful length of the data elements conveyed in it.

A data group identifier is incremented by 1 (modulo 1024 for example) at each transmission of a new group. The end of transmission of a group is marked by the dispatch, in the last container, of an error control (CRC 32 bits). A file is subdivided into groups of fixed size, except obviously for the last group which contains the rest of the data elements.

4. Container for ATM data transportation services in transparent mode

In this mode, the 53 bytes of an ATM cell are conveyed in a 54-byte container.

All the data elements belonging to these services are conveyed in containers that are assigned to one or more users by means of the associated signalling channel. This designation may also be done by a pointing device. A pointer associates one or more subscriber numbers to a logic path and consequently to an ATM link. If the access information elements are far too bulky, then the pointer designates a signalling container contained in the concerned data path. This container then indicates the place in which the useful data elements of the service can be found.

The logic path is open for the entire period of the transmission (one session). The 53 bytes are included in a container.

5. ATM transportation containers in non-transparent mode

In this case (as for the previous case), the type of AAL is an information element which, possibly, will not be obtained. In this case, the three corresponding bits are positioned at 1.

The four bits AAL, PT, Rfu and Clp must be copied, for their meaning has not yet been clearly established at the present time, and they could be useful for the decoding of the ATM cell. The connection with one or more users is done either by a pointing mechanism or by a association between users and a service identifier (obtained from the virtual conduit identifier and the virtual path identifier) and a logic path identifier. A continuity index is incremented by 1 (modulo 4096 for example) during the transmission of a new cell.

The acronyms AAL, PT, Rfu and Clp are terms commonly used in ATM technology. They are defined in particular in the glossary (page 63) of No. 144, 2nd quarter 1991, of the journal "L'Echo des Recherches" distributed by the Centre National des Télécommunications et l'Ecole Nationale Supérieure des Télécommunications.

6. Containers for synchronous services

All the data elements belonging to these services are conveyed in containers that are accessible to one or more users by means of the associated signalling path. This designation may also be done by a pointing device. A pointer associates one (or more) subscriber numbers with a service or logic path identifier.

If the access information elements are far too bulky, then the pointer designates a signalling container contained in the concerned data path. This container then indicates the place where the useful data elements of the service are located. A user may access these information elements by a selection done on the basis of the information elements contained in the signalling path (name of the service, calendar of services, etc.).

A continuity index is incremented by 1 (modulo 4096) during the transmission of a new cell.

7. Container for magazine transportation services

All the data elements belonging to these services are conveyed in containers that have been described in the associated signalling path. The designation gives the position of the channel conveying the magazine and gives the information elements needed for tracking the concerned containers. If the access information elements are too bulky, then the descriptor is replaced by a pointer to a signalling container contained in the concerned data path. This container then indicates the position of the useful data elements of the service.

The logic path is opened during the entire transmission period of the magazine (one session). The magazine is organized into pages. These pages may be updated. A page is a unit of information elements to be processed in a single block. The pages are organized in containers of identical size (the last container contains the rest of the data).

A logic path identifier contained in the selection header enables the temporary association of the containers with a given service and given magazine (session). A page identifier enables the selection of one out of n pages.

The rest of the header provides for the reconstruction of the contents of a page of a specific magazine. The first container indicates the total number of containers of the page. The intermediate containers convey the indication of the number of containers remaining to be transmitted. This permits the discontinuous reception of the page sections. The last container indicates the useful length of the data elements conveyed in this container.

An error control field (CRC) is added at the end of the data elements of a page.

8. Conveyance of containers containing pointers

The fields of bits indicated here above are those that must obligatorily be supplied with information but other fields may be added as a function of each service:
- a bit (CA) designating the presence or absence of access control information elements,
- a logic path identifier equal to 0 when the service is identified directly or when there may be a flag indicating its presence. This is also the case for a channel indicator,
- a flag (C/V) making it possible to find out if it is the position of the service path or of the container. For example, for paging, the position of he container conveying the message (containing a maximum of 96 bytes) replaces the information relating to position of the service path,
- tracking information giving for example the rules of transmission imposed on the containers following the first one (spacing in number of frames, position in the frame, etc.).

Figure 7:
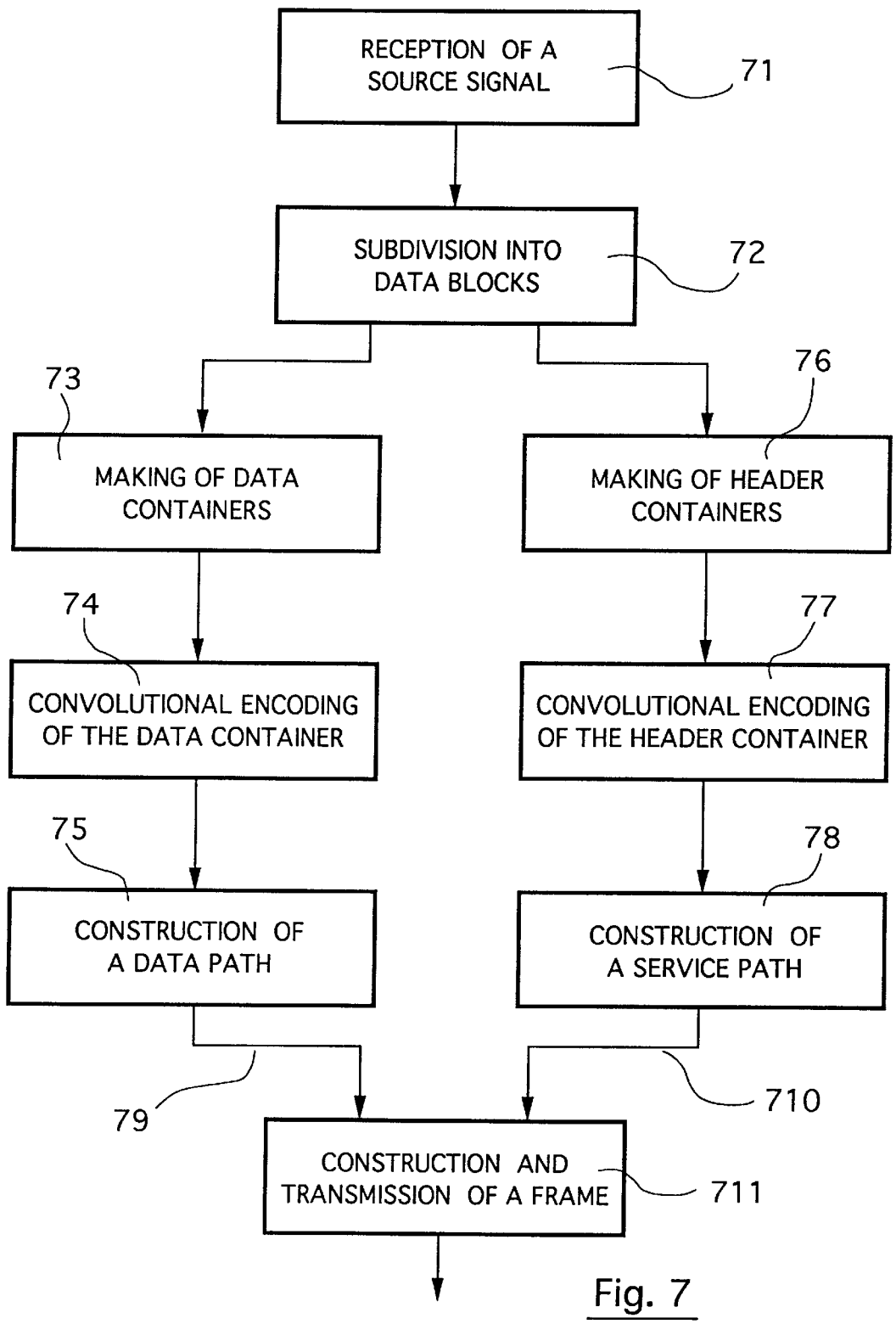
FIG. 7 is a block diagram of the method of construction and broadcasting of frames according to FIG. 3.

The invention also relates to the method of constructing and broadcasting a signal as described here above. FIG. 7 is a general block diagram illustrating the principle of this method.

In a first stage, a source signal to be transmitted is received (71). This may be a paging message, an information signal, a file, ATM cells, etc. Then this signal is subdivided (72) into data blocks. Then the containers according to the invention are built. It is possible to distinguish firstly the construction of the data containers (73, 74, 75) and secondly the construction of the header containers (76, 77, 78).

With respect to he data elements, each container (73) is made and then a specific convolutional encoding (74) is applied to each container. The containers after encoding are organized (75) into data paths 79.

At the same time, containers of headers are made (76). These containers of headers are also subjected to an independent convolutional encoding (77) and then assembled (78) into service paths 710.

The data paths 79 and service paths 710 (and possibly other standard channels and sub-channels) are organized (711) into frames which are transmitted.

We claim:

1. A digital signal designed to be received by a plurality of receivers, at least one of the receivers having limited autonomy, of the type organized in signal frames, each signal frame comprising a main service channel organized into sub-channels characterized in that at least certain of said frames further comprise at least one data channel organized into blocks of independent data elements dedicated to a single service, called containers, each container comprising:
   - a header constituted by a selection sub-header containing inter alia data elements for identifying a group of at least one container destination receiver, and a service sub-header containing inter alia data dedicated to the service;
   - a useful data field containing source data elements corresponding to a given service; and
   - an error detection and/or correction data field,
   - said selection sub-headers being disconnected from their containers and assembled in at least one specialized service container subjected to a simplified channel encoding so that said receivers can detect the presence of a container that is dedicated to it by the low-cost analysis of the decoding of said specialized service container,
   - said selection sub-headers further containing access data elements enabling the position of the corresponding container in said data path to be determined,
   - each container independently undergoing a specific convolutional encoding.

2. A signal according to claim 1, characterized in that said data path is subdivided into at least two channels, each of said channels undergoing a distinct channel encoding.

3. A signal according to claim 1, characterized in that at least one first channel undergoes a temporal interlacing and in that at least one second channel does not undergo any temporal interlacing.

4. A signal according to claim 1, said signal being organized in blocks of elementary data elements of a predefined size, called capacity units, characterized in that each container consists of a whole number of capacity units.

5. A signal according to claim 1, characterized in that at least certain of said containers each carry a data cell in the ATM (asynchronous transfer mode) format.

6. A signal according to claim 1, characterized in that at least certain of said selection sub-headers are transmitted by anticipation in at least one frame preceding the frame that contains the corresponding container.

7. A signal according to claim 1, characterized in that at least certain of said containers comprise confirmation data elements placed at the beginning of the container and making it possible to specify and/or validate the identification of a destination receiver of the following data elements in said container.

8. A signal according to claim 1, characterized in that said data path is placed at the end of each frame.

9. A method for the broadcasting of a digital signal comprising the following acts:

providing at least one identified source signal element designed to be received by at least one specific receiver;

construction at least one data container corresponding to said identified source signal element, comprising the acts of:

subdividing said signal source element into at least one data block of a predetermined size;
specifically convolutionally encoding said data block;
associating a selection sub-header with said data block, said selection sub-header containing at least data elements for the identification of at least one container destination receiver and a service sub-header containing at least data elements dedicated to the service;

creating at least one special selection container in which there are said selection sub-headers disconnected from the corresponding headers;

constructing a data path containing a plurality of containers, among them at least one special selection container;

constructing a signal frame comprising in particular said data path; and transmitting said frame.

10. A method for the reception of a signal according to claim 1, in a destination receiver of said signal element with sporadic operation, comprising the following acts:

putting the device out of standby mode, this putting out of standby mode being activated at regular time intervals, corresponding substantially to the duration of at least one of said frames, by means of an internal clock;

searching for the synchronization of the frame that is being transmitted and the resetting of said internal clock;

reading, at a predetermined location in said frame, a set of selection sub-headers corresponding to the containers contained in said frame and searching for a selection sub-header designating a container intended for said receiver;

analyzing said selection sub-header designating a container intended for said receiver so as to determine the position in said frame of said container; and directly reading said container and convolutionally decoding said container independently of the other containers.

* * * * *